United States Patent
Edholm et al.

(10) Patent No.: US 9,009,341 B2
(45) Date of Patent: Apr. 14, 2015

(54) VIDEO BANDWIDTH MANAGEMENT SYSTEM AND METHOD

(75) Inventors: Philip K. Edholm, Pleasanton, CA (US); Moni Manor, Mountain View, CA (US); Gregory Osterhout, Coppell, TX (US)

(73) Assignee: Avaya Inc., Basking Ridge, NJ (US)

( * ) Notice: Subject to any disclaimer, the term of this patent is extended or adjusted under 35 U.S.C. 154(b) by 161 days.

(21) Appl. No.: 13/271,066

(22) Filed: Oct. 11, 2011

(65) Prior Publication Data

US 2013/0091296 A1    Apr. 11, 2013

(51) Int. Cl.
G06F 15/16    (2006.01)
H04N 7/15    (2006.01)
H04M 3/56    (2006.01)
H04L 29/06    (2006.01)

(52) U.S. Cl.
CPC .............. *H04N 7/152* (2013.01); *H04M 3/567* (2013.01); *H04L 65/1083* (2013.01); *H04L 65/403* (2013.01); *H04L 65/80* (2013.01)

(58) Field of Classification Search
CPC .................. H04L 29/06176; H04L 29/06476
USPC ........... 709/231, 204; 348/14.08; 379/202.01, 379/204.01; 370/468
See application file for complete search history.

(56) References Cited

U.S. PATENT DOCUMENTS

| | | | |
|---|---|---|---|
| 6,677,979 B1* | 1/2004 | Westfield | 348/14.12 |
| 7,007,098 B1* | 2/2006 | Smyth et al. | 709/233 |
| 7,411,901 B1* | 8/2008 | Alexander et al. | 370/230 |
| 7,768,543 B2* | 8/2010 | Christiansen | 348/14.08 |
| 7,898,597 B2* | 3/2011 | Urabe et al. | 348/555 |
| 8,181,117 B2* | 5/2012 | Bruce et al. | 715/771 |
| 8,300,556 B2* | 10/2012 | Kalipatnapu et al. | 370/260 |
| 8,380,790 B2* | 2/2013 | Lee et al. | 709/205 |
| 8,472,520 B2* | 6/2013 | Banerjee | 375/240.12 |
| 8,593,504 B2* | 11/2013 | Lin et al. | 348/14.08 |
| 8,773,494 B2* | 7/2014 | Barkley et al. | 348/14.07 |
| 8,782,165 B2* | 7/2014 | Fee et al. | 709/217 |
| 2003/0048846 A1* | 3/2003 | Lee | 375/240.12 |
| 2008/0267282 A1* | 10/2008 | Kalipatnapu et al. | 375/240.01 |
| 2010/0153574 A1* | 6/2010 | Lee et al. | 709/231 |
| 2011/0158313 A1* | 6/2011 | Ogata | 375/240.02 |
| 2011/0228845 A1* | 9/2011 | Banerjee | 375/240.07 |
| 2011/0249073 A1* | 10/2011 | Cranfill et al. | 348/14.02 |
| 2011/0310216 A1* | 12/2011 | Lee et al. | 348/14.08 |
| 2012/0191805 A1* | 7/2012 | Fee et al. | 709/217 |
| 2012/0307890 A1* | 12/2012 | Lu et al. | 375/240.03 |

(Continued)

OTHER PUBLICATIONS

O'Neil, Timothy M., "IP Bandwidth Guide," White Paper by Polycom, Jan. 28, 2003, 16 pages, Published by Polycom, Pleasanton, California, USA.

(Continued)

*Primary Examiner* — Jimmy H Tran

(57) ABSTRACT

A video conference is set up by a video conference system between three or more video terminals. Each video terminal in the video conference sends its video stream to the video conference system. The video conference system in turn sends out the video streams to video terminals to set up a video conference in the traditional manner. A video controller receives an indication of a change in how at least one of the other video terminals is displaying a video stream from one of the video terminals. Based on the indication of change, a change to the bit rate of the video stream is made. This results in the video conference system be able to send reduced bandwidth based on who is viewing the video conference.

16 Claims, 5 Drawing Sheets

(56) References Cited

U.S. PATENT DOCUMENTS

2013/0136218 A1* 5/2013 Kure et al. .................... 375/356
2014/0286438 A1* 9/2014 Apte ........................ 375/240.26

OTHER PUBLICATIONS

Lin Lin, et al., U.S. Appl. No. 13/025,536, filed Feb. 11, 2011, entitled "Changing Bandwidth Usage Based on User Events," currently pending.

* cited by examiner

VIDEO BANDWIDTH MANAGEMENT SYSTEM AND METHOD

TECHNICAL FIELD

The system and method relates to video systems and in particular to managing bandwidth of video systems based on how users are viewing a video conference.

BACKGROUND

Today's video conferencing systems tend to be limited and fixed in how participants are viewed in a video conference. Many systems only allow a user to see what is streamed to the user by a video conference bridge or router. A user may receive a stream of each site or participant in the video conference or perhaps the user may see the last participant to speak in the video conference. One such problem is the ability to manage video bandwidth more efficiently. What is needed is a solution that not only provides the user with the ability to control which participants they want to view in a video conference, but also the ability to more efficiently manage the bandwidth of the video conference based on the ability of the user to control which participant they are viewing in the video conference.

SUMMARY

The system and method are directed to solving these and other problems and disadvantages of the prior art. A video conference is set up by a video conference system between three or more video terminals. Each video terminal in the video conference sends its video stream to the video conference system. The video conference system in turn sends out the video streams to video terminals to set up a video conference in the traditional manner. A video controller receives an indication of a change in how at least one of the other video terminals is displaying a video stream from one of the video terminals. Based on the indication of change, a change to the bit rate of the video stream is made. This results in the video conference system being able to reduce bandwidth based on who is viewing a video conference.

In another embodiment, for larger video conferences, multiple video conference systems are used. Bandwidth can be configured based on which video terminals connect with each video conference system. In a similar manner, video bandwidth can be reduced based on how users are viewing the video conference.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
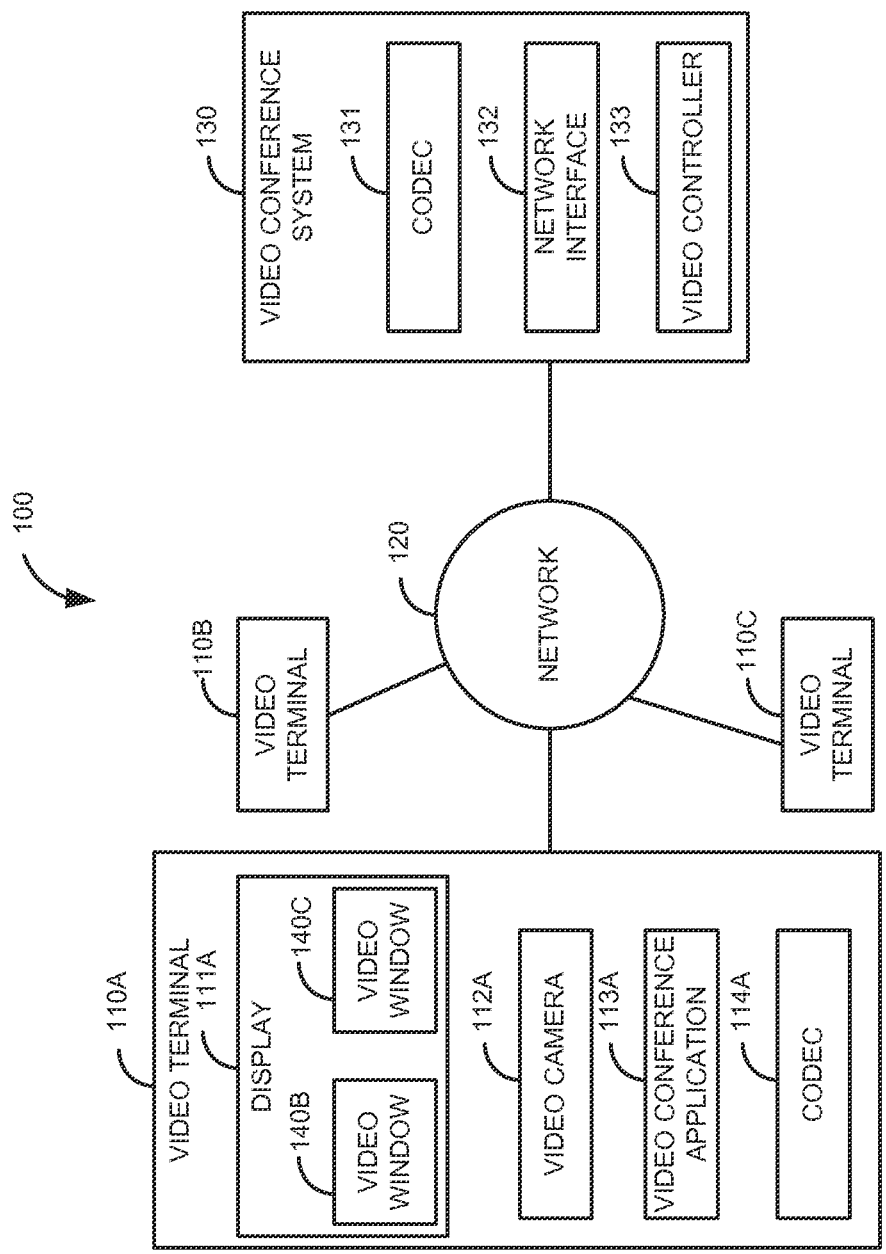
FIG. 1 is a block diagram of a first illustrative system for managing video conference bandwidth.

FIG. 1 is a block diagram of a first illustrative system 100 for managing video conference bandwidth. First illustrative system 100 comprises video terminals 110A-110C, network 120, and video conference system 130. Video terminal 110A comprises display 111A, video camera 112A, video conference application 113A, and codec 114A. Video terminal 110 can be any device that can be used in a video conference, such as a Personal Computer, a Personal Digital Assistant (PDA), a mobile telephone, a video projection system, and the like. Video terminals 110B-110C are not shown with elements 111-114 in order to simplify FIG. 1. When discussing first illustrative system 100, assume that video terminals 110B-110C also comprise corresponding elements 111-114 (i.e., 111B-114B for video terminal 110B and 111C-114C for video terminal 110C). In this illustrative example, three video terminals 110A-110C are shown. However, additional video terminals 110 can be added to first illustrative system 100 to form an even larger video conference. Likewise, first illustrative system 100 could be used to form a point-to-point video conference between two users.

Display 111 can be any type of device that can display a video stream, such as a monitor, a television, a Liquid Crystal Display (LCD), a Cathode Ray Tube (CRT), a projection system, and the like. Display 111 is shown in this exemplary embodiment as displaying two video windows 140B-140C. However, display 111 can show any number of video streams including displaying no video streams. Video windows 140B-140C typically contain video streams of a video conference. In this example, video window 140B displays the video stream from video terminal 110B and video window 140C displays the video stream from video terminal 110C.

Likewise, video terminals 110B and 110C will have corresponding video windows 140. Video terminal 110B will contain video windows 140A and 140C. Video terminal 110C will contain video windows 140A and 140B. The user of each video terminal 110 can control how the corresponding video windows 140 can be displayed. For example, a user can resize a video window 140, open a video window 140, close a video window 140, move a video window 140, and the like.

Video camera 112 can be any device that can be used in a video conference to provide an image/video signal for a video conference. Video conference application 113 can be any hardware/software that manages a video conference for video terminal 110. Codec 114 can be any hardware/software that can encode and decode a video signal.

Network 120 can be any network that can send and receive video streams, such as the Internet, a Wide Area Network (WAN), a Local Area Network (LAN), the Public Switched Telephone Network (PSTN), a packet switched network, a circuit switched network, a cellular network, a combination of these, and the like. Network 120 can use a variety of protocols, such as Ethernet, Internet Protocol (IP), Session Initiation Protocol (SIP), Integrated Services Digital Network (ISDN), and the like.

Video conference system 130 can be any hardware/software that can be used to set up a video conference, such as a video server, a router, a video mixer, a video router, a Private Branch Exchange (PBX), and the like. Video conference system 130 also comprises codec 131, network interface 132, and video controller 133. Codec 131 can be any hardware/software that can encode and decode a video signal. Codec 131 can be similar or identical to codec 114. Codec 131 can be multiple codecs. Network interface 132 can be any hardware/software that can send and receive video information, such as an Ethernet card, a wireless interface, a wired interface, an optical interface, an ISDN card, a cellular card, and the like. Video controller 133 can be any hardware/software that can control the processing/routing of video signals.

To set up a video conference between video terminals 110A-110C, video conference applications 113A-113C work in conjunction with video conferencing system 130 to set up a video conference using various methods known in the art. Once the video conference is established between video terminals 110A-110C, each video terminal 110A-110C generates and sends a video stream to video conferencing system 130. For example, video camera 112A will capture a video signal of a conference participant at video terminal 110A (not shown). The video signal from video camera 112A is encoded by codec 114A using known video encoding techniques, such as such as H.264, H.263, VC-1, and the like. The encoded video stream is then sent to video conference system 130 and received at network interface 132. Codec 131 can optionally decode the video stream and encode it using a different encoding technique. Video terminals 110B-110C in like manner generate and send a video stream to video conferencing system 130. In this example, there are three video streams (referred to as N (N=3) in the claims where N is a positive integer) received at network interface 132.

Network interface 132 sends two (N-1) video streams via network interface 132 to each of the other video terminals 110 in the video conference. For example, network interface 132 sends the video streams from video terminals 110B and 110C to video terminal 110A. Likewise, network interface 132 sends the video streams from video terminals 110A and 110B to video terminal 110C and network interface 132 sends the video streams from video terminals 110A and 110C to video terminal 110B. This creates the video conference between video terminals 110A-110C.

Video controller 133 is configured to receive an indication of a change in how at least one of the users of a video conference is viewing one or more of the received N-1 video streams. For example, if a user of video terminal 110A is no longer viewing the video stream from video terminal 110B (by the user closing or minimizing video window 140B), video conference application 113A detects this change and sends a message to video controller 133. The message indicates that the user is no longer viewing the video stream from video terminal 110B. Video controller 133 receives the indication of the change in the message. Similarly, a user at terminal 110A may view a much smaller picture of the video stream.

Likewise, if a user of video terminal 110C is also not viewing the video stream from video terminal 110B, video conference application 113C detects this change and sends a message to video controller 133 that indicates that the user is no longer viewing the video stream from video terminal 110B. Video controller 133 receives the indication of the change in the message. Similarly, a user at terminal 110C may view a much smaller picture of the video stream.

After receiving the two messages that indicate that the users of video terminals 110A and 110C are not viewing the video stream from video terminal 110B, video controller 133 can cause a change to the bit rate of the video stream from video terminal 110B. This can be accomplished in various ways. For example, video controller 133 can send a message to video terminal 110B to stop sending the video stream to network interface 132 (thus causing network interface 132 to stop sending the video stream to video terminals 110A and 110C) or to cause codec 114B to send at a lower bit rate. Another alternative would be for video conferencing system 130 to stop sending the video stream from video terminal 110B to video terminals 110A and 110C.

To continue this example, after a period of time, the user(s) of video terminals 110A and/or 110C decide to view the video stream from video terminal 110B (e.g., by opening the minimized video window 140B). In this example, after receiving the indication that the user(s) now wants to view the video stream from video terminal 110B, video controller 133 sends a message to codec 114B to cause codec 114B, to start sending the video stream from video terminal 110B to video conferencing system 130, which in turn sends the video stream from video terminal 110B to video terminals 110A and 110C.

In yet another example, instead of starting and stopping the video stream, the bit rate of the video stream can be changed. For example, if the users of video terminal 110A and 110C, rather than closing video window 140B, instead make video window 140B smaller (in a way that will accommodate a lower bit rate). In response to the users making video window 140B smaller, video terminals 110A and 110C both send messages that indicate the change of making the video window 140B smaller. Upon receiving the messages, video controller 133 sends a message to video terminal 110B that causes codec 114B to lower the bit rate (bandwidth) of the video stream from video terminal 110B. Video terminals 110A and 110B now receive the lower bit rate video stream via network interface 132. Likewise, the bit rate could be increased if one or both of the users increase the size of video window 140B. The above processes can be repeated for each of the video streams in the video conference.

To continue the above example, if only one of the users (e.g., user at 110A) increases the window size requiring a higher bit rate, video terminal 110B would receive the message indicating to send at the higher bit rate (like above). Codec 114B would send the received video stream from video terminal 110B at the higher bit rate. After receiving the video stream from video terminal 110B, codec 131 could lower the bit rate of the video stream from video terminal 110B that is sent to video terminal 110C because video terminal 110C can still work properly at the lower bit rate. The video stream that is sent to video terminal 110A would still be sent at the higher bit rate.

Figure 2:
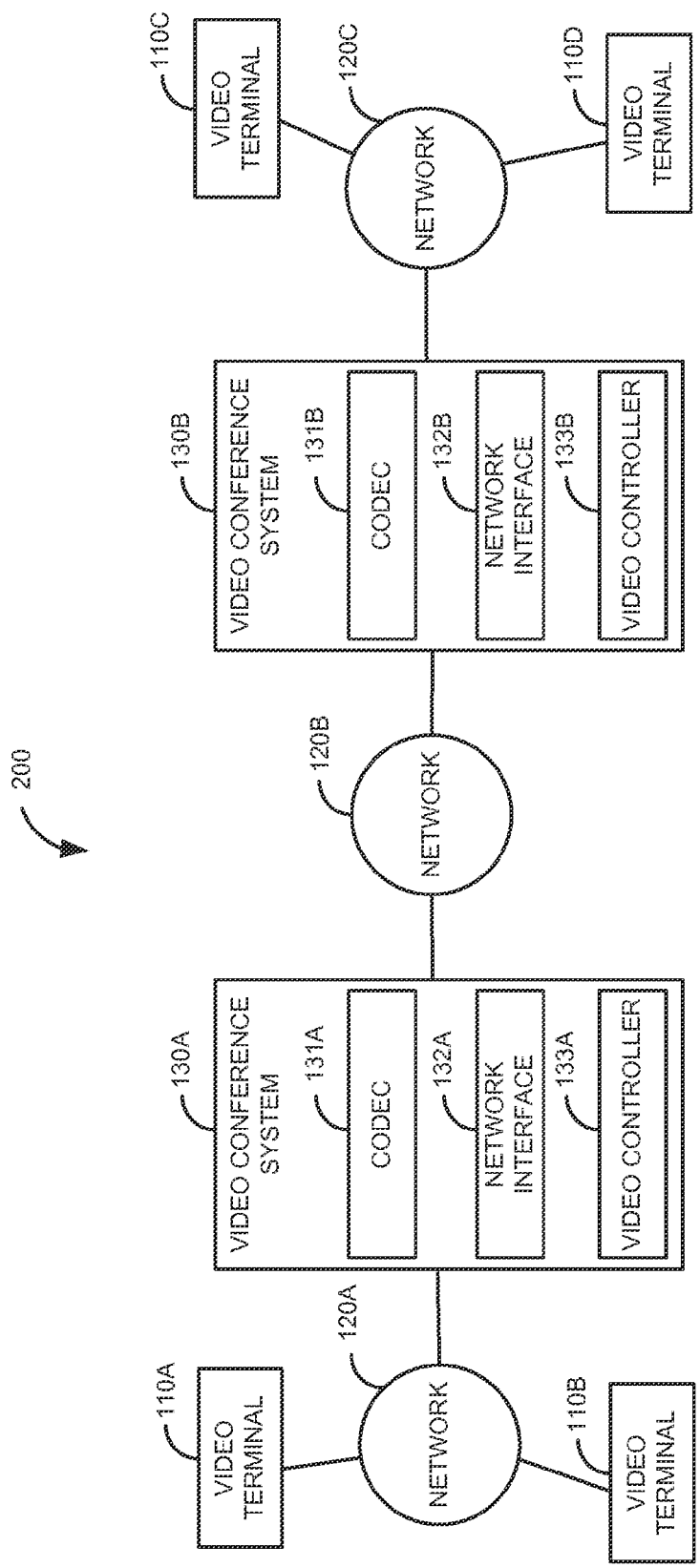
FIG. 2 is a block diagram of a second illustrative system for managing video conference bandwidth.

FIG. 2 is a block diagram of a second illustrative system 200 for managing video conference bandwidth. Second illustrative system 200 comprises video terminals 110A-110D, networks 120A-120C, and video conference systems 130A-130B. Like described in FIG. 1, video terminals 110A-110D comprise corresponding elements 111-114. Networks 120A-120C can be the same network or different networks.

To set up a video conference between video terminals 110A-110D, video conference applications 113A-113D work in conjunction with video conference systems 130A-130B to set up a video conference using various methods known in the art. Once the video conference is established between video terminals 110A-110D, video terminals 110A-110B generate and send a video stream to video conference system 130A via network interface 132A. Video conference system 130A then sends the video streams from video terminals 110A-110B to video conference system 130B. Video conference system 130B sends via network interface 132B (or directly) the video streams from video terminals 110A-110B to video terminals 110C-110D.

Likewise, video terminals 110C-110D generate and send a video stream to video conference system 130B via network interface 132B. Video conference system 130B sends via network interface 132A the video streams from video terminals 110C-110D to video conference system 130A. Video conference system 130A receives the video streams from video conference system 130B via network interface 132B. Video conference system 130A sends via network interface 132A the video streams from video terminals 110C-110D to network terminals 110A-110B. In this example, there are 4 video streams (N=4) and each of the video terminals 110A-110D receive the N−1 video streams from the other video terminals 110 in the video conference.

Video controllers 133A-133B receive from network terminals 110A-110D an indication of a change of how at least one of the video terminals 110A-110D are displaying the video streams. For example, video controller 133A receives an indication of the change from video terminal 110B that the video stream from video terminal 110A is no longer being displayed. Likewise, video controller 133B receives an indication of change from video terminals 110C-110D that the video stream from video terminal 110A is no longer being displayed. Video controllers 133A and/or 133B cause the bit rate in video terminal 110A to change by sending a message to video terminal 110A that indicates to stop sending the video stream.

How video controllers 133 coordinate how to determine if a change in a bit rate of a codec 131/114 or video terminal 110 can be accomplished in various ways. For example, one of the video controllers 133A or 133B can be designated a master controller through an arbitration process. The arbitration process can be based on various factors, such as processing power, proximity to video terminals 110A-110D, and the like. Once a master controller is designated, all indications of a change are sent or forwarded to the master controller. This process can also be used where there are more than two video controllers 133 as shown in FIG. 2.

In an alternative embodiment, assume that all of the video terminals 110A-110D are sending their video streams as described previously. A subset of the video terminals (110C and 110D) sends their video streams to video conference system 130B. Likewise, a subset of the video terminals (110A and 110B) sends their video stream to video conference system 130A. Assume that video terminals 110C-110D indicate that the video stream from video terminal 110A is no longer being viewed at video terminals 110C-110D. However, video terminal 110B is still viewing the video stream from video terminal 110A. Video controller 133B determines that the video stream from video terminal 110A it is receiving from network interface 132A is no longer necessary since video terminals 110C-110D are no longer viewing the video stream from video terminal 110A. Video controller 133B sends a message to video controller 133A to stop sending the video stream from video terminal 110A. Codec 131A stops sending the video stream from video terminal 110A. However, codec 131A still continues to send the video stream from video terminal 110A to video terminal 110B. An alternative would be where codec 131B stops sending the video stream to video terminals 110C-110D.

The above process can also work for instances where the indication of the change is where video terminals 110C-110D are now displaying the video stream from video terminal 110A at a smaller size that can use a lower bit rate. The message would be for codec 131A to send the stream from video terminal 110A at a lower bit rate to network interface 132B via network interface 132A.

If codec 131A is sending at a lower bit rate, the indication of the change can be that video terminals 110C-110D need to display the stream from video terminal 110A in a larger size that requires a higher bit rate. The message would be for codec 131A to send the video stream to video terminal 110A at a higher bit rate to network interface 132B via network interface 132A.

In yet another example, assume that a video conference is set up in the same manner described above between video terminals 110A-110D. A user of video terminal 110B decides that he/she no longer wants to view the video stream from video terminal 110A and minimizes video window 140A. Video terminal 110B sends a message to video controller 133A that indicates that the video stream from video terminal 110A is no longer being displayed. Video controller 133A can then instruct codec 131A to not send the video stream from video terminal 110A to video terminal 110B. The video stream from video terminal 110A will be still sent to video terminals 110C and 110D via network interfaces 132A-132B.

Figure 3:
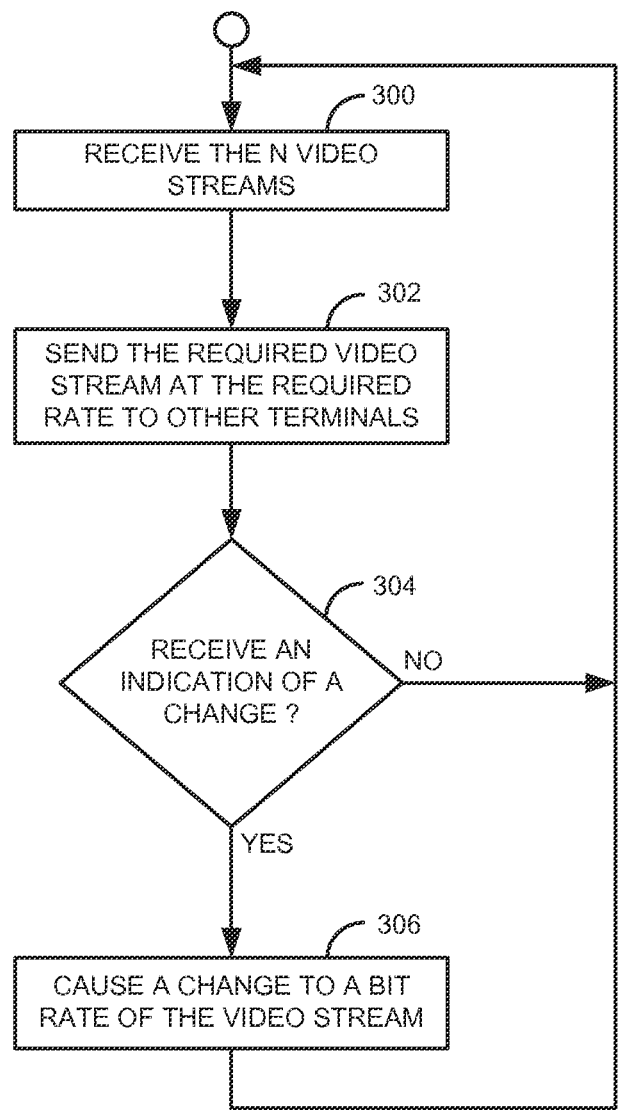
FIG. 3 is a flow diagram of a method for managing video conference bandwidth.

FIG. 3 is a flow diagram of a method for managing video conference bandwidth. Illustratively, video terminal 110, display 111, video camera 112, video conference application 113, codec 114, network 120, video conference system 130, codec 131, network interface 132, and video controller 133 are stored-program-controlled entities, such as a computer or processor, which performs the method of FIGS. 3-5 and the processes described herein by executing program instructions stored in a tangible computer readable storage medium, such as a memory or disk. The description of FIG. 3 is illustrated in conjunction with first illustrative system 100 from FIG. 1.

As described above, to set up a video conference between video terminals 110A-110C, video conference applications 113A-113C work in conjunction with video conferencing system 130 to set up a video conference using various methods known in the art. Once the video conference is established between video terminals 110A-110C, each video terminal 110A-110C generates and sends a video stream to video conferencing system 130. The N video streams (3 in this example) are then received 300 at network interface 132. Codec 131 can optionally decode the video stream and encode it using a different encoding technique and/or resolution/bit rate. Video terminals 110B-110C in like manner generate and send a video stream to network interface 132.

Network interface 132 sends 302 video streams to the other video terminals in the conference via network interface 130. The sent video streams may be sent at different rates to different video terminals 110 based on a highest common bit rate. For example, network interface 132 sends the video streams from video terminals 110B and 110C to video terminal 110A. Likewise, network interface 132 sends the video streams from video terminals 110A and 110B to video terminal 110C and network interface 132 sends the video streams from video terminals 110A and 110C to video terminal 110B. This creates the video conference between video terminals 110A-110C.

Video controller 133 waits in step 304 to receive an indication of a change of how at least one of the N video terminals 110 is viewing the received video streams. If no indication of change is received in step 304, the process goes to step 300. Otherwise, if an indication of a change in how users of the video conference are viewing the received video streams is received in step 304, the process goes to step 306. For example, if a user of video terminal 110A is no longer viewing the video stream from video terminal 110B (by the user closing or minimizing video window 140B), video conference application 113A detects this change and sends a message to video controller 133 that indicates that the user is no longer viewing the video stream from video terminal 110B. Video controller 133 receives the indication of the change in the message.

Likewise, if a user of video terminal 110C is also not viewing the video stream from video terminal 110B, video conference application 113C detects this change and sends a message to video controller 133 that indicates that the user is no longer viewing the video stream from video terminal 110B. Video controller 133 receives the indication of the change in the message.

After receiving the two messages that indicate that the users of video terminals 110A and 110C are not viewing the video stream from video terminal 110B, video controller 133 can cause 306 a change to the bit rate of the video stream from video terminal 110B. This can be accomplished in various ways. For example, video controller 133 can send a message to video terminal 110B to stop sending the video stream to network interface 132 (thus causing network interface 132 to stop sending the video stream to video terminals 110A and 110C) or to cause codec 114B to send at a lower bit rate. Another alternative would be for video conferencing system 130 to stop sending the video stream from video terminal 110B to video terminals 110A and 110C.

In the example above, the caused change in the bit rate was based on receiving two messages that indicate a change from two video terminals. However, in alternative embodiments, a change can be based on receiving a single message containing the indication of change. For example, if the indication of change is that a user has made their video window 140 smaller (and all the other views of the same video window 140 are at approximately the same size), the change would be sent at a lower bit rate.

Figure 4:
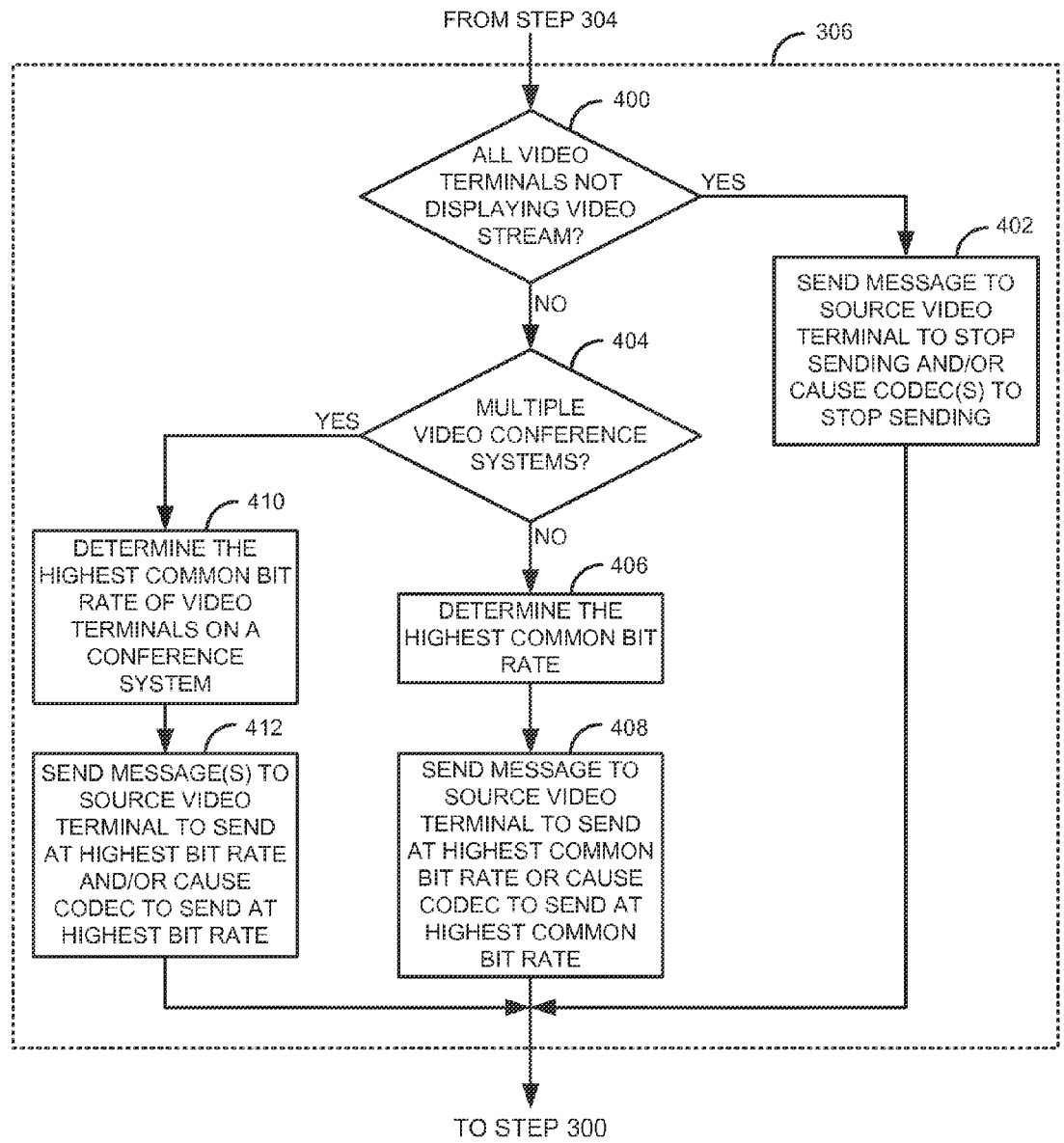
FIG. 4 is a flow diagram of a method for determining how to manage video conference bandwidth.

FIG. 4 is a flow diagram of a method for determining how to manage video conference bandwidth. FIG. 4 is an expanded view of step 306 in FIG. 3. Note that the process of FIG. 4 can be used for the video stream of each video terminal 110 in a video conference. After receiving the indication of change in step 304, video controller 133 determines in step 400 if all of the N-1 video terminals 110 are not displaying a video stream of one of the video terminals 110. If all of the video terminals 110 of the N-1 video terminals 110 are not displaying a video stream of one of the video terminals 110, video controller 133 sends 402 a message to the source video terminal 110 to stop sending its video stream and the process goes to step 300. An alternative would be to cause either codec 114 of the source video terminal 110 to stop sending the video stream or for codec 131 to stop sending the video stream of the source video terminal 110 to the N-1 video terminals 110.

If one or more of the video terminals 110 are displaying a video stream in step 400, the process goes to step 404. If there are not multiple video conference systems 130 in step 404, video controller 133 determines 406 the highest common bit rate of the N video terminals 110. The highest common bit rate is the highest bit rate that each of the video terminals 110 that are viewing a conference would deem acceptable (which may be user-defined or administered by a system administrator). Video controller 133 sends 408 a message to the source video terminal 110 to send at the highest common bit rate or to cause codec 131 or 114 (of the originating video terminal 110) to send at the highest common bit rate. The process then goes to step 300.

If there are multiple video conference systems 130 in step 404, video controllers 133 for the video conference systems 130 determine 410 the highest bit rate of the video terminals 110 on each video conference system 130. Like described in FIG. 2, video terminals 110A-110B are on video conference system 130A and video terminals 110C-110D are on video conference system 130B. Video controller(s) 133(A and/or B), based on the highest common bit rate of the video terminals 110A-110D, sends 412 a message(s) to the source video terminal 110 and/or causes codec 131A/131B to change the bit rate to the highest common bit rate. The process then goes to step 300.

For example, assume that there is a video conference as shown in FIG. 2 between video terminals 110A-110D. Initially, each user (at 110B, 110C, and 110D) is displaying the video stream from video terminal 110A at 1024P (pixels). Each user in the video conference resizes their video window 140A (the video stream from video terminal 110A). The result is that the video stream from video terminal 110A requires that each video terminal 110B-110D, at minimum, display as follows: 110B 1024P (1024 Pixels), 110C 560P, and 110D 780P. Video controller 133B receives the indication of change indicating that video terminal 110C can receive at 560P. Video controller 133B receives the indication of change indicating that video terminal 110D can receive at 780P. Video controller 133B determines 410 that the highest common bit rate for video terminals 110C-110D is 780P. Video controller 133B causes a change in the video stream from video terminal 110A by sending 412 a message to video controller 133A. This message causes codec 131A to change the bit rate (change to 780P) of the video stream sent from codec 131A to video conference system 130B. Codec 131A continues to send the 1024P stream received from video terminal 110A to video terminal 110B.

Later the user at video terminal 110B minimizes video window 140A. Video controller 133A receives the indication that video terminal 110B no longer needs to receive the 1024P video stream from video terminal 110A. Video controller 133A sends a message to video terminal 110A that indicates to change the bit rate to 780P (the highest common bit rate of video terminals 110B-110D). Codec 114A now sends the video stream from video terminal 110A at 780P to video conference system 130A. Codec 131A receives the video stream from video terminal 110A and sends the video stream to video conference system 130B at 780P. Codec 131B then streams the video stream to video terminals 110C-110D. This can be done by sending the video stream from video terminal 110A at 780P to both video terminals 110C and 110D or by sending at 560P to video terminal 110C and at 780P to video terminal 110D. Video controller 133A also stops sending the video stream from video terminal 110A to video terminal 110B.

Figure 5:
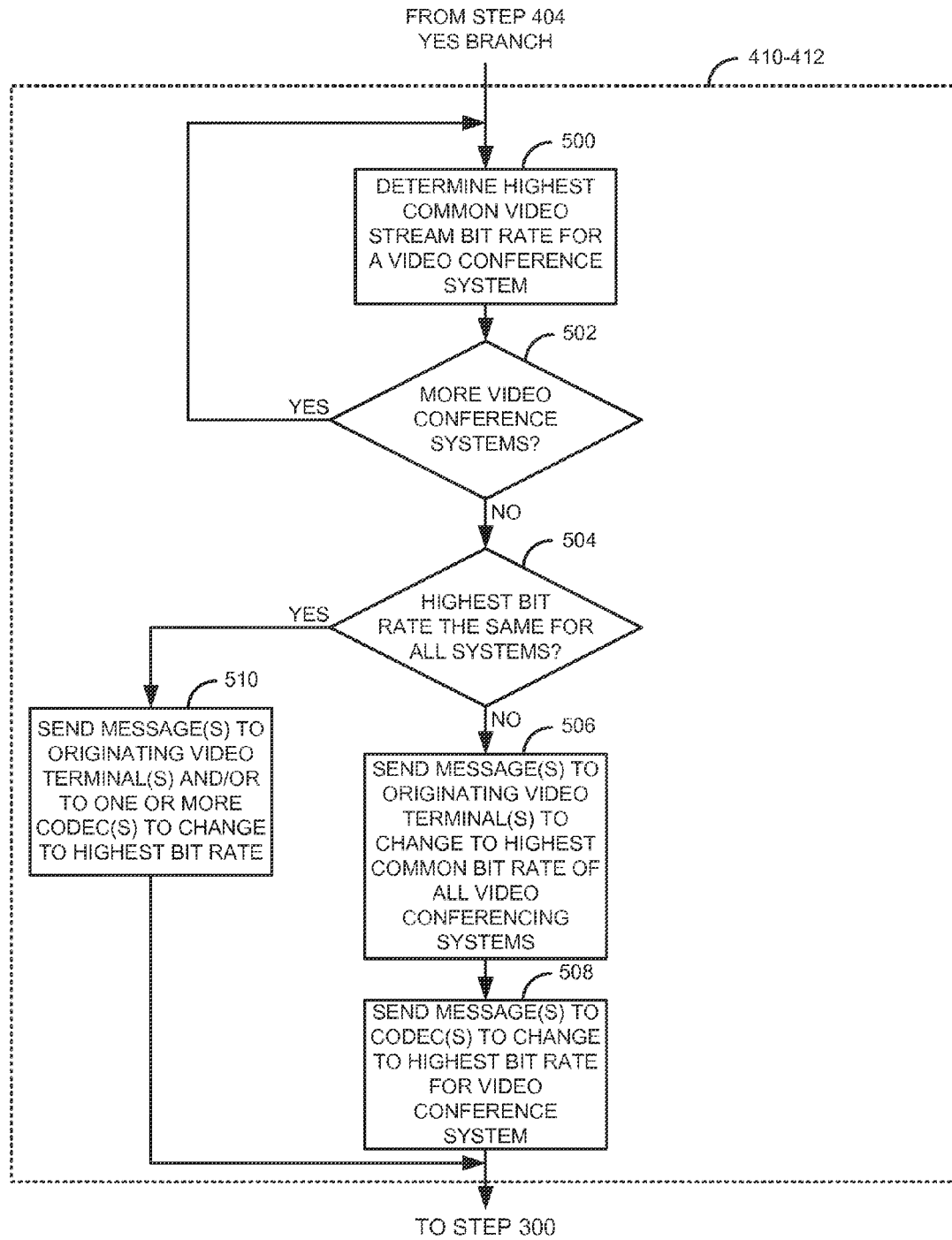
FIG. 5 is a flow diagram of a method for determining bit rates for multiple video conferencing systems.

FIG. 5 is a flow diagram of a method for determining bit rates for multiple video conferencing systems 130. FIG. 5 is a flow diagram of steps 410-412 in FIG. 4. After determining that there are multiple video conference systems 130 in step 404, video controller 133 determines 500 the highest common video stream bit rate for a video conference system 130. For example, video conference 130A can determine the highest common bit rate for each video stream being sent to video terminals 110A-110B. Likewise, video conference system 130B can determine the highest common bit rate for each video stream being sent to video terminals 110C-110D. In an alternative embodiment, one of the video controllers 133A or 133B can be designated a master video controller and determine the highest common bit rate for all the video terminals 110A-110D off of video conference systems 130A-130B.

If there are more video conference systems 130 in step 502, the process goes to step 500. Otherwise, if there are not more video conference systems 130 in step 502, the process goes to step 504. If the highest common bit rate is the same for all video conference systems in step 504, video controller 133 sends 510 a message(s) to the originating video terminal 110 and/or to one or more codecs 114/131 to change to the highest common bit rate. The process goes to step 300.

If the highest common bit rate is not the same for all video conference systems 130 in step 504, video controller 133 sends 506 one or more messages to the originating video terminal(s) 110 to change to the highest common bit rate of all video conferencing systems 130. Video controller 133 sends 508 message(s) to codec(s) 131 to change to the highest bit rate for a video conference system 130.

For example, if the highest common bit rate of video terminals 110A-110B is 560P for video stream 110D and the highest common bit rate for video terminal 110C is 780P for video stream 110D, video controller 133B sends 506 a message to video terminal 110D (the originating video terminal) to change the bit rate to the highest common bit rate of 780P. Video controller 133B sends 508 a message to codec 131A to change the bit rate of video stream from video terminal 110D to 560P.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing bandwidth comprising:
 receiving at a network interface, N video streams from N video terminals, wherein N is 3 or more video streams;
 sending from the network interface, N−1 video streams to each of the N video terminals to form a video conference, wherein the N−1 video streams sent to each of the N video terminals comprise video streams from other video terminals in the video conference;
 receiving in a video controller via the network interface, an indication of a change in how at least one of the N video terminals is displaying a received one of the N−1 video streams sent from the network interface; and
 responsive to receiving the indication of the change in how the at least one of the N video terminals is displaying the received one of the video streams, causing a change to a bit rate of the received one of the N−1 video streams, wherein causing the change to the bit rate comprises determining a highest common bit rate for the N video terminals that are displaying the received one of the N−1 video streams and, after determining the highest common bit rate, sending a message to a video terminal that is a source of the received one of the N−1 video streams lowering the bit rate to the highest common bit rate when the indication indicates a decrease in the display size of the received one of the video streams.

2. The method of claim 1, wherein causing the change to the bit rate of the received one of the video streams comprises: sending from the video controller a message to the video terminal that is the source of the received one of the N−1 video streams, wherein the message is to change in a codec in the video terminal the bit rate of the received one of the video N−1 streams.

3. The method of claim 1, wherein causing the change to the bit rate of the received one of the video streams comprises: changing in a codec in a video conferencing system, the bit rate of the received one of the N−1 video streams.

4. The method of claim 1, wherein the indication of the change is that the other video terminals are not displaying the received one of the video streams and in response to the indication of the change, sending a first message to the video terminal that is the source of the received one of the video streams, wherein the first message indicates to stop sending the received one of the video streams.

5. The method of claim 4, wherein at least one of the other video terminals is requesting to display the received one of the video streams and in response to the request to display the received one of the video streams, sending a second message to the video terminal that is the source of the received one of the video streams, wherein the second message indicates to start sending the received one of the video streams.

6. The method of claim 4, further comprising the step of: receiving the first message at the video terminal that is the source of the received one of the video streams and in response to receiving the first message, stop sending the received one of the video streams from the video terminal that is the source of the received one of the video streams.

7. A method for managing bandwidth on a plurality of video conferencing systems, each comprising a network interface and a video controller, the method comprising:
 receiving at the plurality of network interfaces, N video streams from N video terminals, wherein N is 3 or more video streams;
 sending from the plurality of network interfaces, N−1 video streams to each of the N video terminals to form a video conference, wherein the N−1 video streams sent to each of the N video terminals comprise video streams from other video terminals in the video conference;
 receiving at one or more of the plurality of video controllers via one or more of the plurality of network interfaces an indication of a change in how at least one of the other video terminals is displaying a received one of the video streams; and in response to receiving the indication of the change in how the at least one of the other video terminals are displaying the received one of the video streams, causing a change to a bit rate of the received one of the video streams, wherein causing the change to the bit rate comprises determining a highest common bit rate for the N video terminals that are displaying the received one of the N−1 video streams and, after determining the highest common bit rate, sending a message to a video terminal that is a source of the received one of the N−1 video streams lowering the bit rate to the highest common bit rate when the indication indicates a decrease in the display size of the received one of the video streams.

8. The method of claim 7, wherein a subset of the N video terminals send their respective video stream to one of the plurality of network interfaces, the indication of the change is that the subset of the N video terminals are not displaying the received one of the video streams, and the caused change is to not send the received one of the video streams to the subset of the N video terminals from the one of the plurality of network interfaces.

9. A system for managing bandwidth comprising:
a network interface executing at least in part on a processor, configured to receive N video streams from N video terminals, send N−1 video streams to each of the N video terminals to form a video conference, wherein N is 3 or more video streams and the N−1 video streams sent to each of the N video terminals comprise video streams from other video terminals in the video conference; and
a video controller configured to receive via the network interface an indication of a change in how at least one of the N video terminals is displaying a received one of the N−1 video streams sent from the network interface, and responsive to receiving the indication of the change in how the at least one of the N video terminals is displaying the received one of the video streams, cause a change to a bit rate of the received one of the N−1 video streams;
wherein the video controller configured to cause the change to the bit rate comprises the video controller configured to determine a highest common bit rate for the N video terminals that are displaying the received one of the N−1 video streams and, after determining the highest common bit rate, send a message to a video terminal that is a source of the received one of the N−1 video streams lowering the bit rate to the highest common bit rate when the indication indicates a decrease in the display size of the received one of the video streams.

10. The system of claim 9, wherein the video controller is further configured to cause the change to the bit rate of the received one of the video streams by sending a message to the video terminal that is the source of the received one of the N−1 video streams, wherein the message is to change in a codec in the video terminal the bit rate of the received one of the video N−1 streams.

11. The system of claim 9, wherein the video controller is further configured to cause the change to the bit rate of the received one of the video streams by changing in a codec in a video conferencing system the bit rate of the received one of the N−1 video streams.

12. The system of claim 9, wherein the indication of the change is that the other video terminals are not displaying the received one of the video streams and the video controller is further configured to respond to the indication of the change by sending a first message to the video terminal that is the source of the received one of the video streams, wherein the first message indicates to stop sending the received one of the video streams.

13. The system of claim 12, wherein at least one of the other video terminals is requesting to display the received one of the video streams and the video controller is further configured to respond to the request to display the received one of the video streams by sending a second message to the video terminal that is the source of the received one of the video streams, wherein the second message indicates to start sending the received one of the video streams.

14. The system of claim 12, wherein the video terminal that is the source of the received one of the video streams is further configured to receive the first message and in response to receiving the first message, stop sending the received one of the video streams.

15. A system for managing bandwidth on a plurality of video conferencing systems, each comprising a network interface and a video controller executing at least in part on a processor, the system comprising:
the plurality of network interfaces are configured to receive N video streams from N video terminals and send N−1 video streams to each of the N video terminals to form a video conference, and
wherein N is 3 or more video streams and the N−1 video streams sent to each of the N video terminals comprise video streams from other video terminals in the video conference; and the plurality of video controllers are configured to receive via the plurality of network interfaces an indication of a change in how at least one of the other video terminals is displaying a received one of the video streams and in response to receiving the indication of the change in how the at least one of the other video terminals are displaying the received one of the video streams, cause a change to a bit rate of the received one of the video streams;
wherein the plurality of video controllers configured to cause the change to the bit rate comprises the video controller configured to determine a highest common bit rate for the N video terminals that are displaying the received one of the N−1 video streams and, after determining the highest common bit rate, send a message to a video terminal that is a source of the received one of the N−1 video streams lowering the bit rate to the highest common bit rate when the indication indicates a decrease in the display size of the received one of the video streams.

16. The system of claim 15, wherein a subset of the N video terminals send their respective video stream to one of the plurality of network interfaces, the indication of the change is that the subset of the N video terminals are not displaying the received one of the video streams, and the caused change is to not send the received one of the video streams to the subset of the N video terminals from the one of the plurality of network interfaces.

* * * * *